United States Patent
Warmerdam et al.

(10) Patent No.: US 9,188,349 B2
(45) Date of Patent: Nov. 17, 2015

(54) AIR-CONDITIONING SYSTEM AND USE THEREOF

(71) Applicant: 2ndAir B.V., Zoetermeer (NL)

(72) Inventors: Thomas Petrus Hendricus Warmerdam, Veldhoven (NL); Sergio Hernandez-Marin, Eindhoven (NL); Robertus Wilhelmus Jacobus Hollering, Veldhoven (NL)

(73) Assignee: 2ndAir B.V., Zoetermeer (NL)

( * ) Notice: Subject to any disclaimer, the term of this patent is extended or adjusted under 35 U.S.C. 154(b) by 0 days.

(21) Appl. No.: 14/424,535

(22) PCT Filed: Sep. 2, 2013

(86) PCT No.: PCT/NL2013/050634
§ 371 (c)(1),
(2) Date: Feb. 27, 2015

(87) PCT Pub. No.: WO2014/038934
PCT Pub. Date: Mar. 13, 2014

(65) Prior Publication Data
US 2015/0211754 A1    Jul. 30, 2015

(30) Foreign Application Priority Data
Sep. 4, 2012  (NL) ................................. 2009415

(51) Int. Cl.
*F24F 3/14*    (2006.01)
*F24F 6/02*    (2006.01)
*B01D 53/26*   (2006.01)

(52) U.S. Cl.
CPC ............... *F24F 3/14* (2013.01); *B01D 53/263* (2013.01); *B01D 53/268* (2013.01); *F24F 3/1411* (2013.01); *F24F 3/1417* (2013.01); *F24F 6/02* (2013.01); *F24F 2003/1435* (2013.01); *F24F 2003/1458* (2013.01)

(58) Field of Classification Search
CPC ............. F24F 3/14; F24F 3/1411; F24F 6/02; F24F 2003/1435; F24F 2003/1458; F24F 3/1417; B01D 3/263; B01D 53/268
USPC ........ 62/271, 314, 315, 655; 95/52, 187, 195; 96/7, 9
See application file for complete search history.

(56) References Cited

U.S. PATENT DOCUMENTS 4,377,398 A * 3/1983 Bennett ..................... C02F 1/14
                                                    96/146
5,116,396 A * 5/1992 Prasad ................. B01D 53/226
                                                    62/655

(Continued)

FOREIGN PATENT DOCUMENTS

WO      2009094032 A1    7/2009

OTHER PUBLICATIONS

International Search Report and Written Opinion issued in corresponding International Application PCT/NL2013/050634, mailed Oct. 21, 2013.

*Primary Examiner* — Mohammad M Ali
(74) *Attorney, Agent, or Firm* — Banner & Witcoff, Ltd.

(57) ABSTRACT

The air-conditioning system comprises a dryer (10) comprising a membrane contactor (11) provided with a first channel (11*b*) for air flow and a second channel (11*a*) for desiccant flow, which channels are separated through a membrane (11*c*). The air conditioning system further comprises a humidifier (20) comprising a membrane contactor. The air flow passes in operation the dryer (10) and the humidifier (30) between an inlet (121) and an outlet (122). The dryer (10) comprises a series connection of a heat exchanger (12) and the membrane contactor (11), which heat exchanger couples air flow from the inlet (121) with desiccant flow from a regenerator (40) and in which membrane contactor (11) the thus heat-exchanged air flow and the heat-exchanged desiccant flow are coupled for drying of the airflow.

20 Claims, 4 Drawing Sheets

(56) References Cited

U.S. PATENT DOCUMENTS

| | | | | |
|---|---|---|---|---|
| 5,123,481 A * | 6/1992 | Albers | B01D 1/14 165/111 |
| 5,226,932 A * | 7/1993 | Prasad | B01D 53/22 95/45 |
| 6,128,919 A * | 10/2000 | Daus | B01D 53/226 62/624 |
| 7,361,206 B1 * | 4/2008 | Jahn | B01D 53/268 73/23.37 |
| 8,182,584 B1 * | 5/2012 | Kirts | B01D 53/263 261/117 |
| 2002/0038552 A1 * | 4/2002 | Maisotsenko | F28D 5/02 62/121 |
| 2002/0096312 A1 | 7/2002 | Korin | |
| 2003/0209141 A1 * | 11/2003 | Wedge | B01D 53/268 95/45 |
| 2007/0107594 A1 * | 5/2007 | Piccinini | B01D 53/22 95/52 |
| 2009/0049983 A1 * | 2/2009 | Thelen | B01D 53/268 95/10 |
| 2011/0303091 A1 * | 12/2011 | Nichols | B01D 53/268 96/8 |
| 2012/0118148 A1 * | 5/2012 | Culp | B01D 53/268 95/52 |

\* cited by examiner

| Module | vector representation in psychrometric chart | Physical phenomena |
|---|---|---|
| Humidifier | ⭦ | Cooling and evaporation of air |
| Heat exchanger | ⭤ | Sensible cooling/ heating of air |
| Dryer | ⭣ | Dry the air |

AIR-CONDITIONING SYSTEM AND USE THEREOF

RELATED APPLICATION DATA

This application is a National Stage Application under 35 U.S.C. 371 of co-pending PCT application PCT/NL2013/050634 designating the United States and filed Sep. 2, 2013; which claims the benefit of Dutch patent application number 2009415 and filed Sep. 4, 2012 each of which are hereby incorporated by reference in their entireties.

FIELD OF THE INVENTION

The invention relates to an air-conditioning system comprising:
- a dryer comprising a membrane contactor provided with a first channel for air flow and a second channel for desiccant flow, which channels are separated through a membrane;
- a humidifier comprising a membrane contactor provided with a first channel for air flow and a second channel for an aqueous liquid, which channels are separated through a membrane,
- a regenerator for regenerating the desiccant flow, which air flow passes in operation the dryer and the humidifier between an inlet and an outlet and which desiccant flow runs in operation in a circuit comprising the dryer and the regenerator.

The invention further relates to use of such an air-conditioning system.

BACKGROUND OF THE INVENTION

Air-conditioning system that operate on the basis of mass and heat exchange over so-called membrane contactors receive attention in an attempt to improve efficiency. Basically, such systems comprise a dryer, a humidifier and a regenerator. Schematic diagrams hereof look rather simple, though the understanding of the operation is rather complex. In fact, such systems are multi-phase and multi-chamber reactor in which mass and heat transfer occurs. An additional complicating factor resides in the desiccant flow: if the solution of desiccant becomes too concentrated, crystals may develop which may reduce the mass transfer in the membrane contactor or even obstruct the desiccant flow. However, relatively high concentrations of desiccant are desired for efficient operation of the system. A further complicating factor resides therein that different locations in the world require significantly different air treatments, so as to arrive in a so-called comfort zone that is appreciated by most people.

One example of an air-conditioning system is known from U.S. Pat. No. 6,887,302. This document proposes the use of a metering device configured to add water so as to increase the water content of the desiccant flow, as well as a control device therefor. By means of adding water to the desiccant flow, the operation of the membrane contactor could be modified, so as to switch between humidification en dehumidification. This known solution however is disadvantageous energetically, as it is very hard to remove again water from the desiccant flow once needed. Moreover, the addition of water is effectively a thinning of the desiccant flow, but it is not evident to obtain a homogeneous solution quickly.

Another example of an air-conditioning system is known from WO2009/094032A1. That prior document discloses a module design wherein flow of cooling fluid, desiccant flow and air flow are integrated into a single multilevel module. As shown in FIG. 1, the air flow (inlet airstream) runs in parallel to the liquid desiccant flow. This reduces the overall both heat and mass transfer efficiency relative to a countercurrent flow design.

A further example of an air-conditioning system is known from manuscripts of Dr Manuel Conde-Petit, particularly 'Open absorption systems for air-conditioning using membrane contactors', 15. *Schweizerisches Status-Seminar<<Energie-and Umweltforschung im Bauwesen>>*, 11-12 Sep. 2008 in Zurich, and 'Open absorption system for cooling and air conditioning using membrane contactors, 2006 Annual report' for the Swiss Government. For sake of clarity, these publications will be referred to as the 2008 report and the 2006 report respectively.

Conde herein proposes a modular design. FIGS. 12 and 13 of the 2008 report show the system that has been designed, made and tested. FIG. 3 of the 2008 report shows a more elaborate diagram. As is clear from FIG. 12, the system is provided with a first air inlet for the air to be treated and a second air inlet for use as a gas flow in the regenerator. The air from the regenerator is removed as an air exhaust. The regenerator unit further comprises a heat exhanger, wherein inlet air is cooled relative to the exhaust air that has passed the regenerator. Both the dryer, referred to as ABS or absorber, and the regenerator, referred to as GEN or desorber, are operated as three-stream contactors of air flow, desiccant flow and water. The 2008 report thereto states that it was clear 'from the beginning that a continuously cooled absorber and a continuously heated desorber would be necessary in the prototype to be built'.

The three-stream membrane contactor is shown in more detail in the 2006 report. It is built out of five structured plates that may be of equal or different size (cross-section), where the membrane constitutes the interface between the air channels and the solution channels. The air flow and the water flow run in a countercurrent manner in parallel channels. The desiccant flow runs in channel extending substantially perpendicular to those for the air flow and the water flow. The structured plates are made of polymer material and are modified by milling, after having been cut to the right size. Due to the small wall thickness of the plates (0.1-0.3 mm), this was delicate according to the 2006 report. Thereto the structured plates were filled with water and freezed on top of a thermally conducting metallic plate. The frozen plate was thereafter milled, using the metallic plate as a carrier. The delicate multi-step manufacturing is a clear disadvantage of the modules used by Conde. It is therefore desired to obtain an improved air-conditioning system with modules that may be made more easily, but still meeting the requirements of the overall process in operation. In fact, said modules were designed by Conde for optimum mass and heat transfer, as deemed necessary to achieve the continuous cooling or heating as deemed necessary.

SUMMARY OF THE INVENTION

It is therefore a first object of the invention to provide an improved air-conditioning system with modules that may be made more easily but still meeting the requirements of stable and robust operation.

It is a further object to provide an air-conditioning system of the type mentioned in the opening paragraphs that can be customized for different climate conditions, and of which the operation may be tuned for accommodation to existing weather conditions.

It is another object to provide use of such an air-conditioning system.

These objects are achieved in an air-conditioning system comprising a dryer comprising a membrane contactor provided with a first channel for air flow and a second channel for desiccant flow, which channels are separated through a membrane; a humidifier comprising a membrane contactor provided with a first channel for air flow and a second channel for an aqueous liquid, which channels are separated through a membrane; and a regenerator for regenerating the desiccant flow. Herein the air flow passes in operation the dryer and the humidifier between an inlet and an outlet and the desiccant flow runs in operation in a circuit comprising the dryer and the regenerator. Furthermore, the dryer comprises a series connection of a heat exchanger and the membrane contactor, which heat exchanger couples air flow from the inlet with desiccant flow from the regenerator and in which membrane contactor the thus heat-exchanged air flow and the heat-exchanged desiccant flow are coupled for drying of the airflow. Preferably, the air flow and the desiccant flow run countercurrent to each other in at least one of the heat exchanger and the membrane contactor, which is good for efficiency.

The objects are further achieved in the use of such an air-conditioning system for the treatment of an air flow.

The inventors have understood that a stable operation may be achieved without the use of a three-stream contactor or similar module wherein cooling fluid, air flow and desiccant flow are integrated. Rather, use is made of a series connection of a heat exchanger and a membrane contactor, both having channels for the air flow and for the desiccant flow. The air flow is herein first heated up through heat exchange with the desiccant flow. Thereafter, the air flow is dehumidified against the desiccant flow. This further cooling of the desiccant flow has the advantage that the desiccant flow has lower vapour pressure at a lower temperature, so that it will more easily absorb water vapour from the air flow. As a side effect of the proximity of the cooled desiccant flow, the air flow is cooled.

It is a major advantage of the present invention that the regenerator module does not need to be equal in size to the heat exchanger or to the humidifier module. This has the advantage that the surface areas of each of these modules may be optimized. Additionally, the risk of crystallizing desiccant due to cooling down of the desiccant flow can also be addressed. Furthermore, the use of separate modules that are different in size allows for climate customization. Optimum in surface area is climate dependent, but also design dependent, such as for instance on price and availability of heat, as well as available space. The size of the dryer typically depends on the humidity of input air in a specific climate; the size of the regenerator would for instance be a function of the intended power of the air conditioner.

In a suitable embodiment, a heat exchanger for the air flow is present, in which heat exchanger the air flow is cooled against a cooling fluid. The presence of this heat exchanger leads to further versatility in conditioning the air flow. The conditioning of air flow is generally understood by means of a path in a psychometric chart constituted through its axes temperature and humidity. The dryer of the present invention may be optimized so as to provide a decrease in humidity without a significant change in temperature. The humidifier of the present invention provides an increase in humidity and a concomitant temperature reduction. The heat exchanger may provide a temperature reduction without change in humidity.

The heat exchanger may be embodied as an indirect evaporative cooler, wherein the cooling fluid is separated from the air flow with a substantially impermeable wall, particularly for water (vapour). The cooling fluid is particularly a combination of a cooling liquid, particularly an aqueous cooling liquid, and a fluid flow, for instance air, the cooling liquid and the fluid flow being separated by a membrane that is permeable for water. Evaporation of the cooling liquid results in cooling of this cooling liquid, and the air flow adjacent to the cooling liquid.

Most suitably, the air flow heat exchanger is coupled between the dryer and the humidifier, but alternatively, it may be coupled in parallel. In a further alternative, the integration of the air flow heat exchanger within the system is arranged through switchable valves, so that it may be used either in parallel or in series dependent on season.

In a further elaboration hereof, at least one of the three modules dryer, heat exchanger and humidifier, is provided with a bypass channel for the air flow, and a controller is present for control of the air flow through either the bypass channel or the said module or both. Thereto, typically regulating valves are provided, which may divide an air flow according to a volume ratio to be set by the controller. As a result, the controller will define the path through the psychometric chart so as to arrive at a desired and/or predefined air conditioning. The advantage of controlling by means of bypass channels is that the operation of each of the modules may remain stationary.

In another elaboration, a controller is present for control of a plurality of pumps in the system. The controller regulates in this embodiment, for instance the power control of the pumps and therewith the flow rate of the fluids pumped through the system. This elaboration may be combined with the one described before.

In addition to bypass channel, the architecture furthermore suitably comprises a feedback channel. Such a feedback channel allows further cooling relative to the drying operation. It has moreover the advantage of setting the relative intensity of cooling and drying without a need for size increase of the overall system. A regulating valve is suitably incorporated in such feedback channel.

An air-conditioning architecture based on several modules that may be tuned independently under control of a controller is a further aspect of the invention. In fact, there are easy means for tuning the operation of each module separately; the operation of the dryer may be controlled with the heating means in the regenerator. It may further be controlled on the basis of the level of the aqueous desiccant solution in the membrane contactor and/or heat exchanger therein. The humidifier may be controlled on the basis of the level of cooling liquid therein. The heat exchanger may be controlled by means of the flow of the cooling liquid. Additionally, the effect of each module on the air flow may be reduced by means of bypass channels. A storage container, particularly for the aqueous desiccant solution but possibly also for the cooling liquid, is suitably present, in the embodiment of control by means of level setting.

Suitably, sensors are present for sensing the condition of the air flow after passing a module. Most suitably, use is made of temperature sensors and/or pressure sensors and/or relative humidity sensors. Furthermore, predetermined operation characteristics of each of the module may be loaded into the controller.

In a suitable embodiment, the regenerator comprises a membrane contactor provided with a first channel for desiccant flow and a second channel for gas flow, which channels are separated through a membrane, such that in operation water of the desiccant flow migrates to the gas flow, thus regenerating the desiccant flow. This embodiment has the advantage that the modules of the system may all be based on the same technology. Therewith, a modular set up with significant options for integration becomes feasible.

In an elaboration thereof, the regenerator further comprises a heat exchanger that couples the desiccant flow originating from the dryer to the desiccant flow originating from the membrane contractor of the regenerator, such that the desiccant flow is heated so as to enable evaporation of water in the membrane contactor of the regenerator and is subsequently cooled.

Preferably, a heating means for heating the desiccant flow originating from the dryer is present. This has the advantage that the operation of the dryer may be controlled with a setting of the heating means. It is an advantage hereof, that the system operation may be controlled in dependence of weather conditions with the heating means. With little heating, the desiccant flow is regenerated little, and its temperature remains relatively low. The absorption of water vapour from the air flow will not be very big. With increased heating, the absorption of water vapour from the air flow will increase. The heating means may be embodied in the form of a conventional heating system for the typically aqueous desiccant flow, but could alternatively be embodied as a heat exchanger with a second heating fluid. In a further implementation, the regenerator comprises a further heat exchanger with a channel for the desiccant flow and a preferably countercurrent channel for a cooling fluid. The implementation with both a heat exchanger with two desiccant flows aims at obtaining a stable reference temperature. This is relevant for the overall operation, as the ratio between said reference temperature and the temperature in the membrane contactor of the dryer effectively defines the amount of water vapour absorbed from the air flow.

In another embodiment, a third heat exchanger is present between the dryer and the regenerator for cooling the desiccant flow. As a consequence, both the membrane contactor of the dryer and the membrane contactor of the regenerator are coupled in series between heat exchangers.

One further option enabled through this coupling, is the provision of a bypass channel between an outlet of the further heat exchanger and a desiccant inlet of the dryer. Though such bypass channel reduces the desiccant concentration of the desiccant flow at the desiccant inlet, the cycle of the desiccant flow is shortened on average. Hence, less desiccant is needed, or alternatively, the flow speed of the desiccant flow may be increased. The latter option is deemed particularly beneficial.

In a preferred embodiment, the gas flow runs in a substantially closed system, wherein the water vapour absorbed in the regenerator is removed by condensation against a cold wall. The use of a substantially closed system for the gas flow has the advantage that this gas flow may be conditioned, and the composition of the gas flow is not changing with the weather conditions, and is not dependent on climate. In the prior art system of Conde, air was used for the gas flow, which needed to be pretreated, and subsequently be removed as exhaust gas. The cold wall is suitably embodied as a wall in a heat exchanger adjacent to a channel with cooling fluid. Such cooling fluid, for instance water or an aqueous liquid, may be running in a partially or substantially closed system itself.

A system with a dryer based on a membrane contactor and furthermore a regenerator comprising a unit with a closed gas flow is herein furthermore claimed by itself. The closed gas flow herein comprises a membrane contactor in exchange with an aqueous solution of desiccant of the regenerator, and a heat exchanger in exchange with a cooling fluid, particularly a cooling liquid such as water. A pump will be present, as will be understood by those skilled in the art. The regenerator may further comprise one or more heat exchangers. Particularly, a first heat exchanger may increase the temperature of the aqueous solution of the desiccant after passing the dryer. Most beneficially, this heat exchanger comprises two channels for the aqueous solution of desiccant: one prior to passing the dryer and the other subsequent to passing the dryer. An additional heat exchanger may be present for further decreasing the temperature of the aqueous solution before passing the dryer. Herein, the aqueous solution may be cooled against a cooling liquid. Such a rather simple architecture may be further modified with any one of the features described in the present application, for instance through the use of a humidifier and optionally an airflow heat exchanger, and/or a dryer module comprising a heat exchanger in addition to a membrane contactor. Bypasses may be present for setting the conditioning level, and also for merely partially regenerating the aqueous solution.

In a further embodiment of such closed gas flow unit, the water outlet of the unit is provided with means for regulating the outflow, for instance a valve with a fluid reservoir in relation thereto. This means prevent the inflow of outdoor air into the closed gas flow unit, at least substantially. A fluid reservoir appears to act as a suitable barrier against such inflow, but alternative embodiments are not excluded. Furthermore, means for isolating the closed gas flow unit from the ambient may be used. One example of such isolating means is the provision of a vessel or closed room or glass house around the closed gas flow unit, wherein merely the liquid outflow could pass. The conditioning of the closed gas flow unit may be controlled with sensors, so as to ensure a constant reference for the system of the invention.

For sake of clarity, it is observed that the desiccant flow is suitably an aqueous solution of a desiccant compound as known per se to the skilled person. The compound is suitably a salt or a salt mixture, but may be different. The aqueous solution may contain any additives for better performance.

The water-containing cooling fluid is suitably an aqueous cooling liquid, such as water, though an aqueous solution could be used alternatively. A water-containing gaseous cooling fluid is not excluded and appears suitable for mobile applications, such as in cars.

The gas from the gas flow may be air or an alternative gas that is able to absorb water vapour. Membranes, as well as membrane contactors, suitable for use in the system of the invention are known per se, for instance from WO2010/127818A1, which is included herein by reference.

BRIEF INTRODUCTION OF THE FIGURES

These and other aspects of the invention will be further elucidated with reference to the figures, in which.

DETAILED DISCUSSION OF ILLUSTRATIVE EMBODIMENTS

Figure 1:
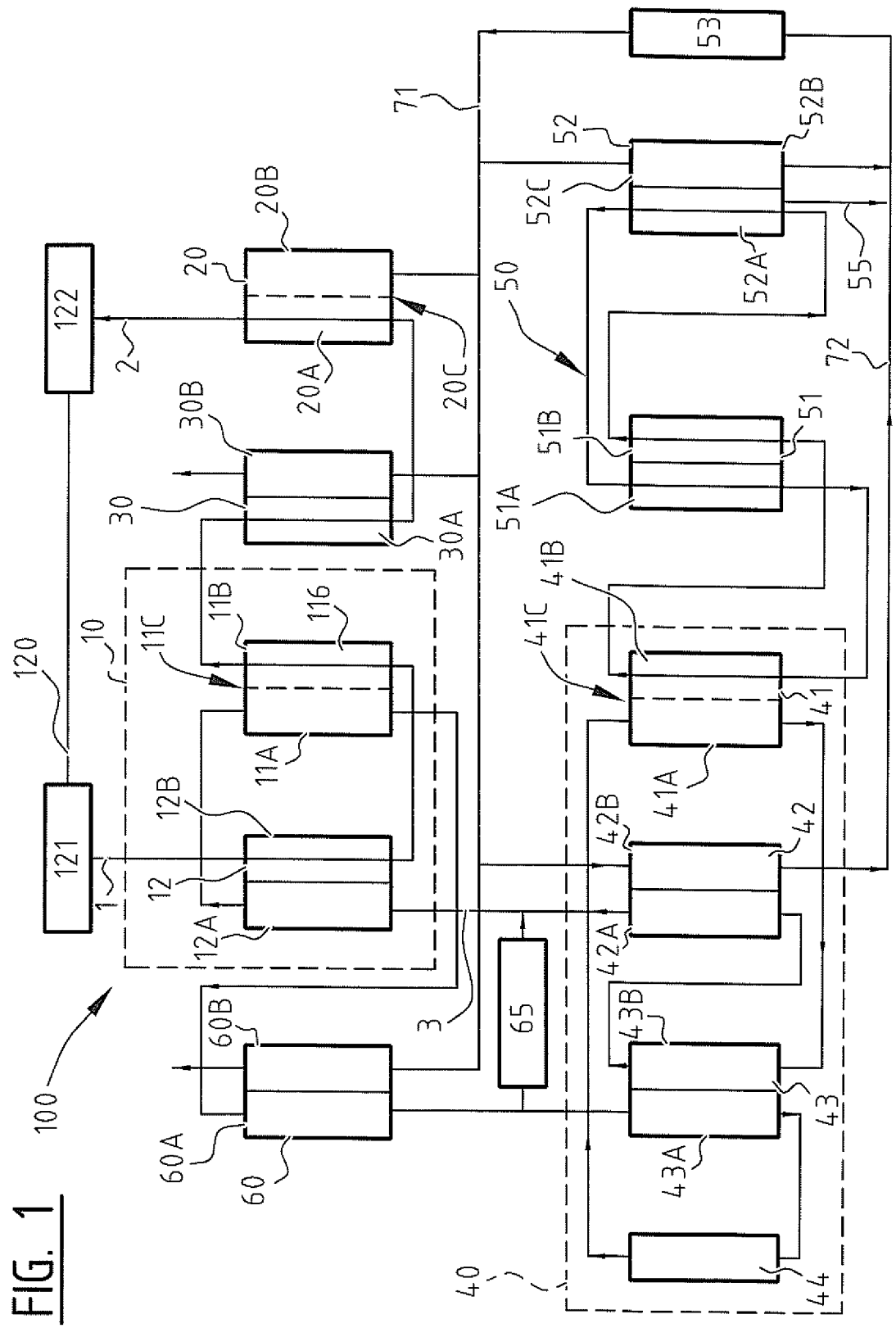
FIG. 1 shows a diagrammatical architecture of the air-conditioning system according to a first embodiment.

The figures are merely intended for illustrative purposes and not drawn to scale. Equal reference numerals in different figures refer to equal or similar elements.

FIG. 1 shows a diagrammatical architecture of the air-conditioning system 100 according to a first embodiment.

The air-conditioning system 100 of the invention comprises most generically a dryer module 10, a humidifier module 20 and a regenerator module 40. In the example shown in FIG. 1, furthermore a heat exchanger module 30, a heat exchanger 60, a bypass module 65, a gas system 50 and conductors for cooling liquid 71, 72 are present.

In operation, the air-conditioning system 100 draws an air volume 121 from a room 120. This typically occurs in a continuous manner, although batch-wise operation is not excluded. In such a case of batch-wise operation, the air volume 120 enters a chamber that is subsequently emptied into the air-conditioning system 100. The air volume thus forms an air flow that enters the air-conditioning system 100 through an inlet 1. The air flow passes the dryer module 10, wherein it is dried effectively without cooling. Subsequently, the air flow may pass a heat exchanger 30, wherein it is cooled, or optionally heated. Alternatively, it bypasses the heat exchanger 30. Thereafter the air flow passes a humidifier 20, and finally leaves the air-conditioning system through the outlet 2 as a conditioned air volume 122 into the room 120. As will be further explained with reference to FIG. 7, the conditioning of the air flow is under control of a controller 90 (not in FIG. 1). According to the invention, the dryer module comprises a heat exchanger 12 and a membrane contactor 11, both of which have a first channel 11A, 12A for desiccant flow and a second channel 11B, 12B for air flow. More precisely, the desiccant flow enters the dryer module 10 at a desiccant inlet 3. It passes then the heat exchanger, resulting in heating of the air flow in the second channel 12B and cooling of the desiccant flow in the first channel 12A. Subsequently, both flows enter the membrane contactor 11, wherein vapour from the air flow may pass from the second channel 11B into the first channel 11A through membrane 11C and be absorbed by the desiccant flow. The pretreatment in the heat exchanger 12 turns out to have a beneficial effect on the absorption: the vapour pressure in the air flow will be higher, while the vapour pressure in the desiccant flow will be reduced. Moreover, by cooling down the desiccant flow just prior to the entrance of the membrane contactor 11, any risk of crystallisation of desiccant salts is reduced.

Figure 4:
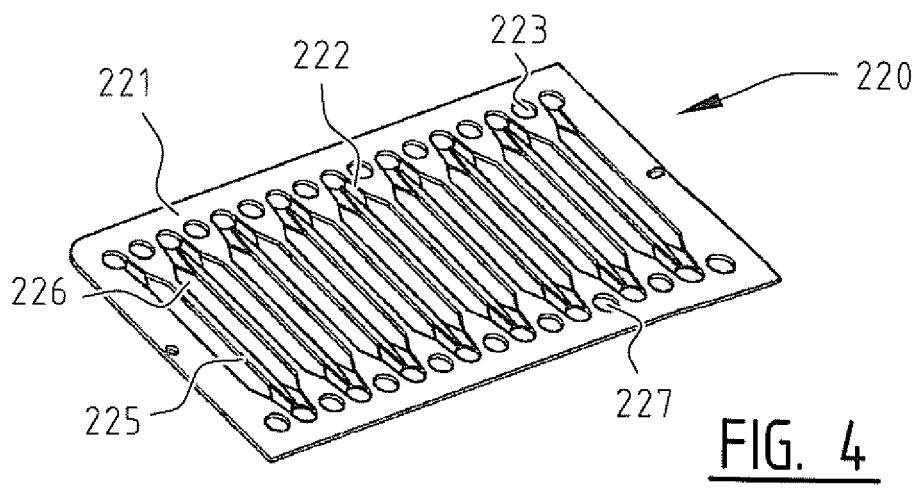
FIG. 4 shows in a schematical bird's eye view a first embodiment of a frame.
Figure 5:
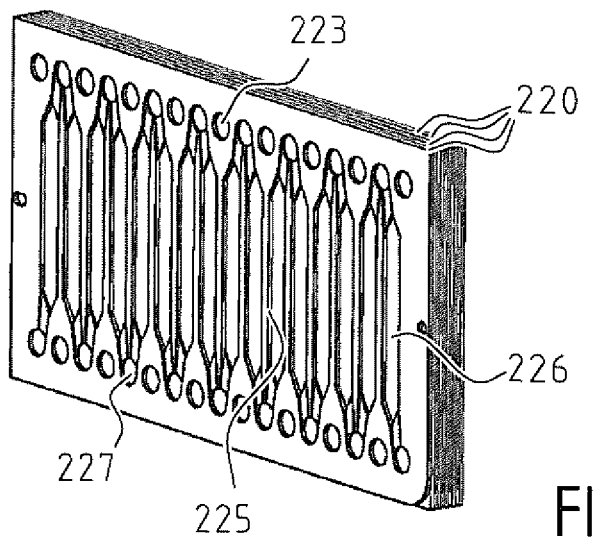
FIG. 5 shows in a schematical bird's eye view a first embodiment of a module.
Figure 6:
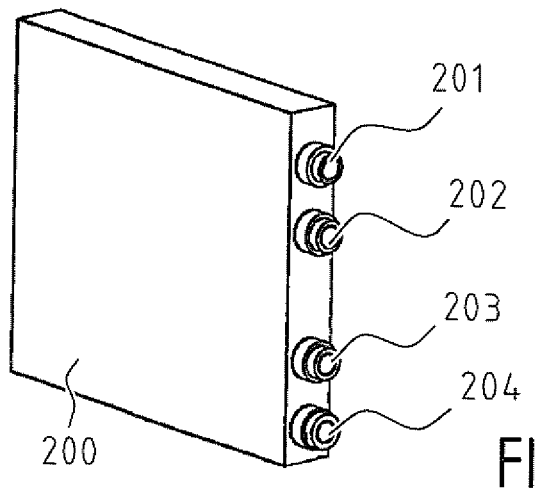
FIG. 6 shows in a schematical bird's eye view a first embodiment of a cassette.

In this manner, the complexity of the dryer module 10 may be reduced significantly, in that it can be operative without continuous cooling. A suitable example of a frame 220 for use in the dryer module 10 is shown in FIG. 4. A plurality of frames 220 is typically assembled, as shown in FIG. 5 and encapsulated to from a cassette 200, as shown in FIG. 6. The same design of frame 220 and cassette 200 may be used for a membrane contactor and for a heat exchanger, but this is not strictly necessary. This same frame may further be used in the regenerator and in the humidifier. However, it is not necessary that all elements in the system are based on the same frame or that the system is fully based on cassettes comprising identical or similar frames.

The advantage of integrating a plurality of frames 220 into a cassette 200 is that the surface area of a single element (i.e. membrane contactor or heat exchanger) may be varied through the number of frames 220 in a single cassette 200 and/or the number of cassettes 200 per element. Moreover, the cassette 200 is a device that is easily transportable and replaceable. While the inputs and outputs 201-204 are shown to be present on a single side, which is the short side, this is not necessary and may even be unhandy from a design perspective due to a necessary internal rearrangement.

The cassette layout has the further advantage that an air-conditioning system may be integrated into construction elements, for instance walls and roofs of buildings, and that it may be combined with other rather planar elements, such as solar cells.

The frame 220 as shown in FIG. 4 comprises tubes 225, 226 running between top and bottom channels 223, 227, which are coupled to input and output respectively (or vice versa). The channel layout is alternating: a channel for the one fluid is adjacent to channels for the other fluid. Dependent on the flow direction in these channels, the flow direction for the two fluids may be either in the same direction or opposed (i.e. counter-current). As can be seen in FIG. 4, the neighbouring tubes 225, 226 are oriented out-of-plane with respect to each other in the present embodiment. Tube 225 is at its top side at the front, and at its bottom side at the back; tube 226 is at its top side at the back, and at its bottom side at the front. This construction appears suitable to generate some space, and therewith to prevent that tubes would press upon each other too much when integrated and when fluid runs through them. As will be understood, such pressing contact could damage the tubes and result in leakage and malfunctioning. The frame 220 is thereto suitably constructed from different layers 222, that are kept together at their edge 221.

It will be understood that design variations are envisageable: width, length and number of tubes may be varied; rather than using a single frame for both fluids, use could be made of frames that are fluid-specific (and stacked in an alternating manner. In order to use space most efficiently, use could be made of frames (or layers) with shifted designs. It will further be understood that the term 'bottom' and 'top' are herein used for sake of simplicity, but do not require any orientation in a product; the frames may be oriented both vertical, horizontal and under an oblique angle. An orientation in which the tubes 225, 226 run substantially horizontal may be preferred for a system wherein setting the level of fluids is used as at least one manner of controlling operation.

In the example as shown in FIG. 1, both the heat exchanger module 20 and the humidifier module 30 use aqueous cooling liquid from conductor 71 as the flow in the second channel 20B, 30B. This is suitable for system integration, but not necessary. The flow in the second channel is most suitably opposite, i.e. in countercurrent direction, to the flow in the first channel.

FIG. 1 further shows the definition of the regenerator 40 according to the first embodiment. The regenerator 40 comprises a membrane contactor 41, heat exchangers 42, 43 and heating means 44. Each of the membrane contactor 41 and the heat exchangers 42, 43 comprises a first channel 41A, 42A, 43A for the desiccant flow. The further heat exchanger 43 and the heating means 44 serve to heat the desiccant flow coming from the dryer module 10. After increasing the vapour pressure of the desiccant flow in this manner, the desiccant flow passes the membrane contactor 41, where the aqueous vapour migrates through the membrane 41C into the gas flow in the second channel 41B. In this manner the desiccant flow is effectively concentrated. The regeneration furthermore comprises a cooling down step, which occurs in the heat exchangers 43 and 42.

Optionally, a bypass module 65 is present, which allows that merely a portion of the desiccant flow is regenerated, while another portion is not regenerated. Although this reduces the concentration of the desiccant flow, it shortens the cycle of desiccant flow, preventing too much heating and cooling. Overall, therewith the total desiccant volume may be either reduced, and/or the flow speed may be enlarged without increase of the total desiccant volume.

A further heat exchanger 60 may be present. It is for instance suitable for bringing the desiccant flow to a transport temperature. Alternatively, the further heat exchanger 60 could be applied as a heating step, for bringing the temperature of the desiccant flow back to its temperature at the inlet of the dryer module 10.

In the embodiment shown in FIG. 1, the gas flow running through the second channel 41B of the membrane contactor 41 of the regenerator 40 runs in a substantially closed system 50 and is substantially recirculated after that the vapour absorbed in the membrane contactor 41 is removed again. This removal occurs in a heat exchanger 52 having cold (condenser) wall 52C. The condensed vapour will leave this heat exchanger through an outlet 55. The heat exchanger 52 herein has a second channel 52B for cooling liquid, which is herein aqueous cooling liquid such as water that has been cooled in cooler 53 and transported through conductor 71. The resulting warmed-up cooling liquid will flow back to the cooler through conductor 72. It may alternatively be removed as exhaust. However, the temperature increase in the heat exchanger 52 is such that reuse is deemed more energy-efficient. It will be understood by the skilled person in the art of process design that a gas inlet and an exhaust gas outlet may be present in the closed gas system. The closed gas system 50 furthermore comprises another heat exchanger 51 for optimum performance.

Figure 7:
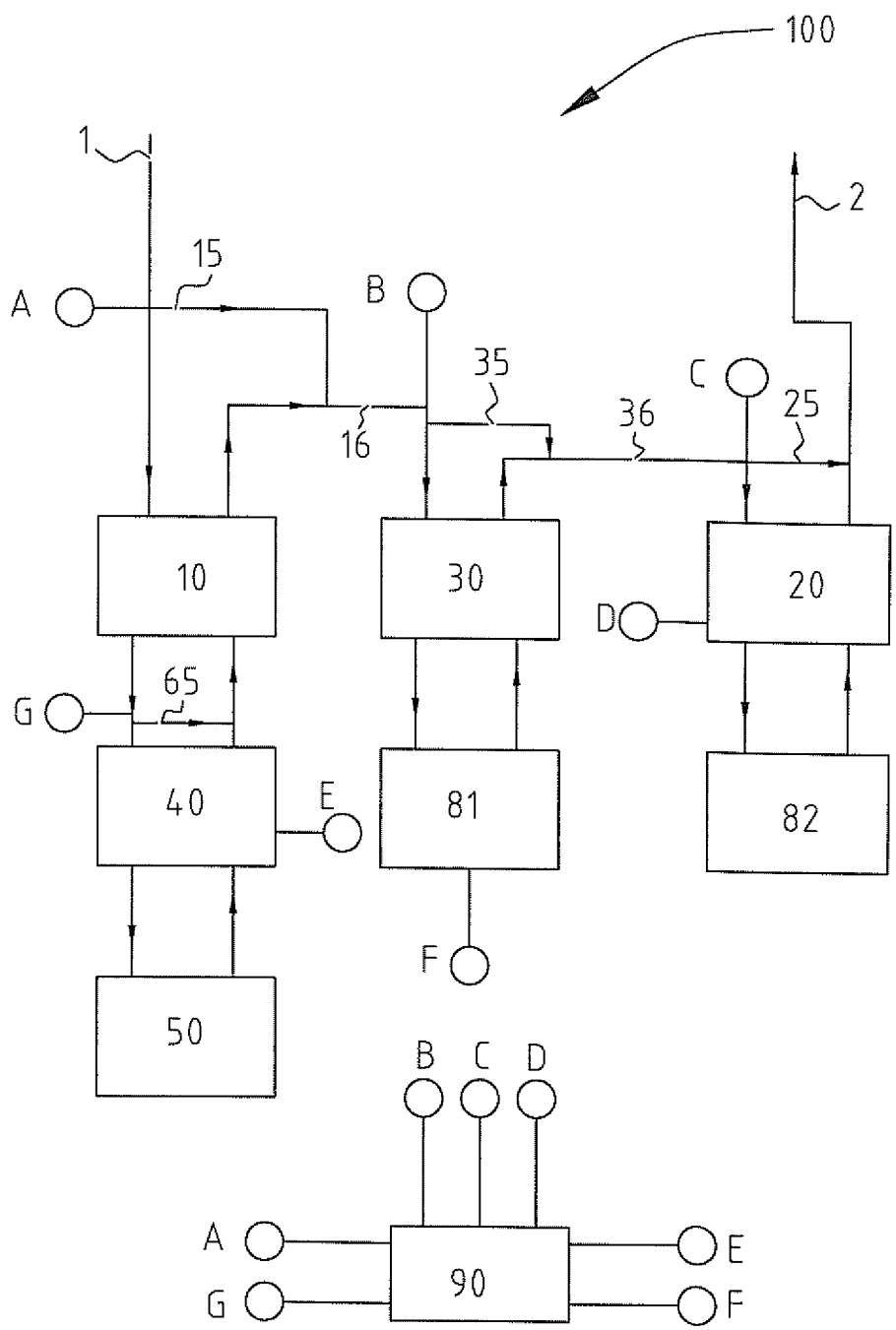
FIG. 7 shows schematically a control architecture for the air-conditioning system of the invention.

FIG. 7 shows a control architecture for an air-conditioning system 100 similar to the one shown in FIG. 1. In the architecture shown in FIG. 7, the contents of the each of the dryer module 10, the heat exchanger module 20, the humidifier module 30, the regenerator module 40, and the gas system 50 are not specified. They are suitably in accordance with the implementation shown in FIG. 1. However, alternative implementations within the scope of the invention are not excluded. Rather than that the heat exchanger module 20 and the humidifier module 30 make use of the same aqueous cooling liquid, FIG. 7 indicates the implementation wherein two separate cooling liquid systems 81, 82 are provided. This is for instance advantageous, so as to allow different temperatures of the aqueous cooling liquid in the exchanger module 20 and the humidifier module 30.

FIG. 7 moreover shows connections 16, and 36 between the dryer module 10 and the heat exchanger module 30, respectively, the heat exchanger module 30 and the humidifier module 20. It is observed that the order of the dryer module 10, the heat exchanger module 30 and the humidifier module 20 as shown in FIG. 1 and FIG. 7 appears beneficial, but alternative orders can be envisaged. For instance, the air flow could be humidified prior to being cooled. Furthermore, it is not excluded that a larger number of treatment modules is present between the inlet 1 and the outlet 2. For instance, although not shown, it is not excluded that some or all of the air flow towards outlet 2 is recirculated to pass one or more of the modules twice.

FIG. 7 further shows bypasses 15, 35, 25 and 65. These bypasses allow that part or all of the airflow bypasses the dryer module 10, the heat exchanger module 30 respectively the humidifier module 20 and that part of the desiccant flow bypasses the regenerator 40. Control points A, B, C and G are present for controlling the extent to which a module 10, 30, 20, 40 is bypassed and are under control of a controller 90.

The controller 90 furthermore is in control of setpoints D, E, F which are effectively drivers of the conditions of the flows in the second channels in each of the dryer module 10, the heat exchanger module 30 and the humidifier module 20. Setpoint D is for instance a metering device defining the level of aqueous cooling liquid in the second channel of the humidifier 20, therewith defining the extent of humidification and cooling. Setpoint E is for instance coupled to heating means 44 (as shown in FIG. 1) so as to define the extent of heating the desiccant flow and therewith concentrating the desiccant flow during the regeneration process. Setpoint F may be a setpoint for the temperature of the cooling liquid for the heat exchanger 20. It will be understood that a further setpoint for defining the air flow at the inlet 1 is suitably present as well. As will be understood by the skilled person, these set points may be implemented in known manner.

With the combination of the different modules 10, 20 and 30 and the control settings A-G, the air may be conditioned to a desired state for a large variety of starting states. Since such starting state is highly climate dependent, it appears beneficial that the air-conditioning system is customized for a specific climate. Also, it may be that the control system is implemented with less control setpoints than those indicated in FIG. 7.

Figures 2, 3:
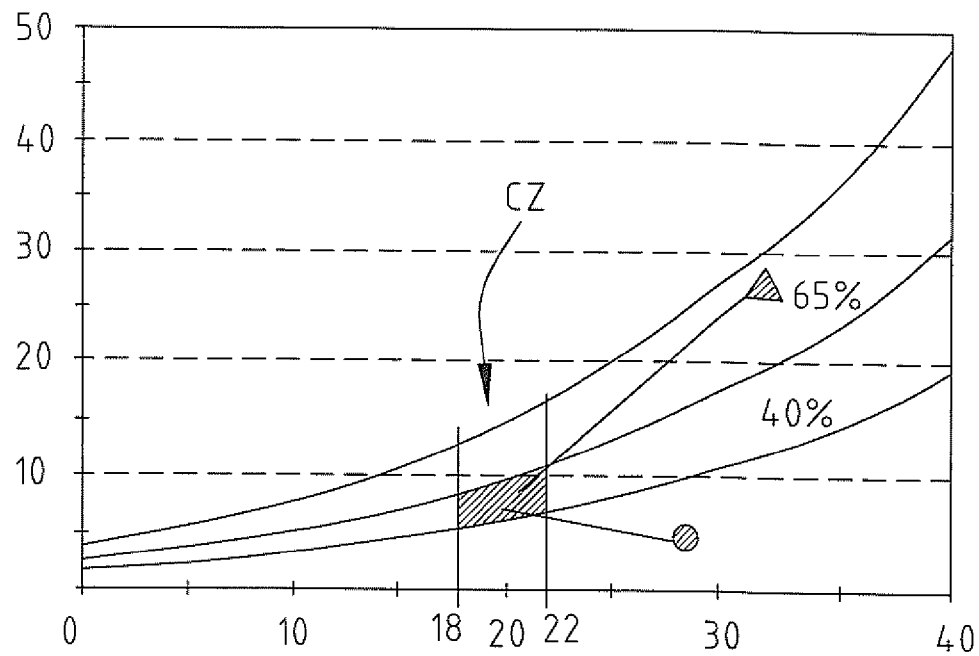
FIG. 2 shows a psychrometric chart.
FIG. 3 is a table indicating function of several modules of the system of the invention.

FIG. 2 shows schematically a psychrometric chart. The x-as indicates the temperature in degrees Celsius. The y-as defines the humidity. On the left side, this humidity is expressed as grams water ($H_2O$) per kilogram of air. The lines in the chart define the relative humidity at different temperatures. CZ refers to the so-called comfort zone, which typically corresponds to the intended conditioning of the air. The circle and the triangle indicate two possible climate and weather conditions in different locations in the world, both with high temperatures but very different relative humidities. It is observed for sake of clarity, that the location of the comfort zone in the chart may shift in accordance with user's preference.

FIG. 3 shows a table in which the vector representation in the psychrometric chart is indicated for each of the humidifier module, the heat exchanger module and the dryer module. It will be understood that the vector representations are simplified for sake of clarity. The length of the arrows is subject to implementation. As shown in FIG. 3, the humidifier results both in cooling and an increase of relative humidity. The heat exchanger does not allow mass transport and therefore merely results in a change in temperature. The dryer according to the invention, with a coupled heat exchanger and membrane contactor, ideally merely reduces the humidity without change in temperature.

It will be understood that a further humidifier module may be defined through a combination of a membrane contactor and a heat exchanger, which ideally does not change temperature either. A further dryer module may be defined on the basis of a membrane contactor only, or a membrane contactor and a minor heat exchanger, which results in both heating and drying of the air flow.

The different modules may thus be used for defining a suitable path through the psychrometric chart, on the basis of which one may arrive in an efficient manner in the CZ.

LIST OF REFERENCE NUMERALS

1 inlet
2 outlet
3 desiccant inlet into dryer module 10
10 dryer module
11 membrane contactor
11B first channel for desiccant flow
11A second channel for air flow
11C membrane
12 heat exchanger
12A first channel for desiccant flow
12B second channel for air flow 20 humidifier module
20A first channel for air flow
20B second channel for aqueous cooling liquid flow
20C membrane
30 heat exchanger module
30A first channel for air flow
30B second channel for cooling liquid flow
40 regenerator module
41 membrane contactor
41A first channel for desiccant flow
41B second channel for gas flow
41C membrane
42 heat exchanger
42A first channel for desiccant flow
42B second channel for cooling liquid flow
43 further heat exchanger
43A first channel for desiccant flow arriving from dryer module
43B second channel for desiccant flow leaving to dryer module
44 heating means
50 closed gas system
51 further heat exchanger
51A first channel for gas flow to regenerator
51B second channel for gas flow from regenerator
52 heat exchanger
52A first channel for gas flow
52B second channel for cooling liquid flow
52C cold (condenser) wall
53 cooling means
55 outlet for condensed water vapour
60 heat exchanger
60A first channel for desiccant flow
60B second channel for cooling liquid flow
65 bypass module
71 conductor of cold cooling liquid
72 conductor of warmed-up cooling liquid
90 controller
A-G control points in the air-conditioning system coupled to the controller 90
100 air conditioning system
120 room
121 air to be drawn from room 120 into air conditioning system 100
122 conditioned air from air conditioning system 100 into room 120
200 cassette
201 first inlet
202 first outlet
203 second inlet
204 second outlet
220 frame
221 edge
222 layer
223 first channel at top side
225 first tube
226 second tube
227 second channel at bottom side The invention clamed is:
1. An air-conditioning system comprising:
a dryer comprising a membrane contactor provided with a first channel for air flow and a second channel for desiccant flow, which channels are separated through a membrane;
a humidifier comprising a membrane contactor provided with a first channel for air flow and a second channel for a water-containing cooling fluid, which channels are separated through a membrane,
a regenerator for regenerating the desiccant flow,
which air flow passes in operation the dryer and the humidifier between an inlet and an outlet and which desiccant flow runs in operation in a circuit comprising the dryer and the regenerator,
wherein the dryer comprises a series connection of a heat exchanger and the membrane contactor, which heat exchanger couples air flow from the inlet with desiccant flow from the regenerator and in which membrane contactor the thus heat-exchanged air flow and the heat-exchanged desiccant flow are coupled for drying of the airflow.

2. The air-conditioning system as claimed in claim 1, further comprising a heat exchanger for the air flow, and wherein the air flow is cooled against a cooling fluid.

3. The air-conditioning system as claimed in claim 2, wherein the air flow heat exchanger is coupled in series in between of the dryer and the humidifier.

4. The air-conditioning system as claimed in claim 1, further comprising a bypass channel around the dryer and a regulating valve dividing the air flow between the bypass channel and the dryer.

5. The air-conditioning system as claimed in claim 1, further comprising a bypass channel around the humidifier and a regulating valve dividing the air flow between the bypass channel and the humidifier.

6. The air-conditioning system as claimed in claim 1, further comprising a feedback channel from the outlet to an output of the dryer, which feedback channel is provided with a regulating valve dividing the air flow the between the feedback channel and the outlet.

7. The air-conditioning system as claimed in claim 1, wherein the regenerator comprises a membrane contactor provided with a first channel for desiccant flow and a second channel for gas flow, which channels are separated through a membrane, such that in operation water of the desiccant flow migrates to the gas flow, thus regenerating the desiccant flow.

8. The air-conditioning system as claimed in claim 7, wherein the regenerator further comprises a heat exchanger that couples the desiccant flow originating from the dryer to the desiccant flow originating from the membrane contractor of the regenerator, such that the desiccant flow is first heated so as to enable evaporation of water in the membrane contactor and is subsequently cooled.

9. The air-conditioning system as claimed in claim 8, wherein the regenerator comprises a further heat exchanger with a channel for the desiccant flow and a preferably countercurrent channel for a cooling fluid.

10. The air-conditioning system as claimed in claim 1, wherein a third heat exchanger is present between the dryer and the regenerator for cooling the desiccant flow.

11. The air-conditioning system as claimed in claim 1, further comprising heating means for heating the desiccant flow originating from the dryer, wherein with a setting of the heating means operation of the dryer may be controlled.

12. The air-conditioning system as claimed in claim 9, wherein a bypass channel is present between an outlet of the further heat exchanger and a desiccant inlet of the dryer.

13. The air-conditioning system as claimed in claim 1, wherein the gas flow runs in a substantially closed system, wherein the water vapour absorbed in the regenerator is removed by condensation against a cold wall.

14. The air-conditioning system as claimed in claim 13, wherein the cold wall is embodied as a wall in a heat exchanger adjacent to a channel with cooling fluid.

15. The air-conditioning system as claimed in claim 8, wherein the cooling fluid is an aqueous liquid present in a circuit comprising a cooler.

16. The air-conditioning system as claimed in claim 1, wherein the water-containing cooling fluid of the humidifier is an aqueous cooling liquid.

17. The air-conditioning system as claimed in claim 16, wherein stagnant or substantially stagnant aqueous liquid, for instance water, is used in the humidifier.

18. The air-conditioning system as claimed in claim 1, wherein the air flow and the desiccant flow run in countercurrent direction in at least one of the heat exchanger and the membrane contactor of the dryer.

19. Use of the air-conditioning system of claim 1, for treatment of an air flow.

20. Dryer module comprising a membrane contactor provided with a first channel for air flow and a second channel for desiccant flow, which channels are separated through a membrane;
   which desiccant flow in use runs in a circuit comprising the dryer and a regenerator for regenerating the desiccant flow;
   wherein the dryer comprises a series connection of a heat exchanger and the membrane contactor, which heat exchanger couples air flow from the inlet with desiccant flow from the regenerator and in which membrane contactor the thus heat-exchanged air flow and the heat-exchanged desiccant flow are coupled for drying of the airflow.

* * * * *